United States Patent
Oyama

(10) Patent No.: US 6,430,182 B1
(45) Date of Patent: Aug. 6, 2002

(54) FABRIC SYSTEM AND METHOD FOR ASSIGNING IDENTIFIER FOR FABRIC APPARATUS THEREFOR

(75) Inventor: Hiroaki Oyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/172,856

(22) Filed: Oct. 15, 1998

(30) Foreign Application Priority Data

Oct. 16, 1997 (JP) .............................................. 9-283578

(51) Int. Cl.[7] .............................................. H04L 12/56
(52) U.S. Cl. ...................................... 370/388; 370/400
(58) Field of Search ................................ 370/396, 360, 370/370, 388, 361, 389, 400; 340/826; 379/271

(56) References Cited

U.S. PATENT DOCUMENTS 6,031,842 A * 2/2000 Trevitt et al. ............... 307/412
6,049,542 A * 4/2000 Prasad ......................... 370/386
6,157,643 A * 12/2000 Ma ............................. 370/389
6,185,203 B1 * 2/2001 Berman ....................... 370/351

* cited by examiner

Primary Examiner—Douglas Olms
Assistant Examiner—Ken Vanderpuye
(74) Attorney, Agent, or Firm—Sughrue Mion, PLLC

(57) ABSTRACT

A fabric system connects a plurality of fabric groups into a plurality of stages between terminal nodes and performs exchange of variable length frame. The fabric has an assignment signal transmitting portion transmitting an assignment signal fixedly assigned an identifier per port connected to other fabrics, a configuration information transmitting portion transmitting a configuration information indicative of correspondence of identifiers of the fabrics connected to the ports, a retrieval information preparing portion preparing a retrieval information for determining a fabric of transfer destination of the received frame per port and a port number on the basis of the identifier of each fabric and the configuration information, and a transfer destination determining portion determining the transfer destination of the frame on the basis of the retrieval information.

19 Claims, 19 Drawing Sheets

SIS FORMAT

| MF FIELD | SF FIELD | SF FIELD | SF FIELD |
|---|---|---|---|
| 1 bytes | 1 bytes | 1 bytes | 1 bytes |

FIG. 10

| | SID CONTROL VALUE | AFTER TRANSMISSION OF SIS OF MF | AFTER TRANSMISSION OF SIS OF SF | AFTER TRANSMISSION OF SIS OF TF |
|---|---|---|---|---|
| FABRIC 21 | 01000000 | 01000000 | 01000000 | 01000000 |
| FABRIC 22 | NOT SET | NOT SET | 01030200 | 01030200 |
| FABRIC 23 | NOT SET | 01030000 | 01030000 | 01030000 |
| FABRIC 24 | NOT SET | 01040000 | 01040000 | 01040000 |
| FABRIC 25 | NOT SET | NOT SET | 01030300 | 01030300 |
| FABRIC 26 | NOT SET | NOT SET | 01030400 | 01030400 |

FIG. 11

| RECEPTION PORT | VALUE OF SIS |
|---|---|
| PORT 1 | NO |
| PORT 2 | NO |
| PORT 3 | 01030200 |
| PORT 4 | 01040200 |

FIG. 12

| PORT NUMBER | LAST RECEIVED SIS | TRANSMISSION SIDE SID |
|---|---|---|
| PORT 1 | 01030000 | 01000000 |
| PORT 2 | 01030203 | 01030200 |
| PORT 3 | 01030301 | 01030300 |
| PORT 4 | 01030401 | 01030400 |

FIG. 13

| SID | FID |
|---|---|
| 01000000 | 0101 |
| 01030000 | 0101 |
| 01030200 | 0101 |
| 01030300 | 0101 |
| 01030400 | 0101 |
| 01040000 | 0101 |

FIG. 14

| RECEPTION PORT | 0101 | 0102 | 0103 | 0104 | 0105 | 0106 |
|---|---|---|---|---|---|---|
| 1 | 1 | (1) | 2 | — | 1 | (2) |
| 2 | 2 | (1) | 1 | — | 2 | (2) |
| 3 | 1 | (1) | 2 | — | 1 | (2) |
| 4 | 2 | (1) | 1 | — | 2 | (2) |

FIG. 16

| | SID CONTROL VALUE | AFTER TRANSMISSION OF SIS OF MF | AFTER TRANSMISSION OF SIS OF SF | AFTER TRANSMISSION OF SIS OF TF |
|---|---|---|---|---|
| FABRIC 101 | NOT SET | NOT SET | 01090100 | 01090100 |
| FABRIC 102 | NOT SET | NOT SET | 01090300 | 01090300 |
| FABRIC 103 | 01000000 | 01000000 | 01000000 | 01000000 |
| FABRIC 104 | NOT SET | NOT SET | 01090700 | 01090700 |
| FABRIC 105 | NOT SET | 01090000 | 01090000 | 01090000 |
| FABRIC 106 | NOT SET | 010b0000 | 010b0000 | 010b0000 |
| FABRIC 107 | NOT SET | 010d0000 | 010d0000 | 010d0000 |
| FABRIC 108 | NOT SET | 010f0000 | 010f0000 | 010f0000 |
| FABRIC 109 | NOT SET | NOT SET | 01090900 | 01090900 |
| FABRIC 110 | NOT SET | NOT SET | 01090b00 | 01090b00 |
| FABRIC 111 | NOT SET | NOT SET | 01090d00 | 01090d00 |
| FABRIC 112 | NOT SET | NOT SET | 01090f00 | 01090f00 |

FIG. 17

| RECEPTION PORT | VALUE OF SIS |
|---|---|
| PORT 1 | NO |
| PORT 2 | NO |
| PORT 3 | NO |
| PORT 4 | NO |
| PORT 5 | NO |
| PORT 6 | NO |
| PORT 7 | NO |
| PORT 8 | NO |
| PORT 9 | 01090300 |
| PORT 10 | 01090400 |
| PORT 11 | 010b0300 |
| PORT 12 | 010b0400 |
| PORT 13 | 010d0300 |
| PORT 14 | 010d0400 |
| PORT 15 | 010f0300 |
| PORT 16 | 010f0400 |

FIG. 18

| PORT NUMBER | LAST RECEIVED SIS | TRANSMISSION SIDE SID |
|---|---|---|
| PORT 1 | 0109010f | 0109010f |
| PORT 2 | 01090110 | 01090110 |
| PORT 3 | 0109030f | 0109030f |
| PORT 4 | 01090310 | 01090310 |
| PORT 5 | 010f0000 | 01000000 |
| PORT 6 | 01100000 | 01000000 |
| PORT 7 | 0109070f | 01090700 |
| PORT 8 | 01090710 | 01090700 |
| PORT 9 | 01090907 | 01090900 |
| PORT 10 | 01090908 | 01090900 |
| PORT 11 | 01090b07 | 01090b00 |
| PORT 12 | 01090b08 | 01090b00 |
| PORT 13 | 01090d07 | 01090d00 |
| PORT 14 | 01090d08 | 01090d00 |
| PORT 15 | 01090f07 | 01090f00 |
| PORT 16 | 01090f08 | 01090f00 |

FIG. 19

| SID | FID |
|---|---|
| 01000000 | 0101 |
| 01090000 | 0102 |
| 01090100 | 0103 |
| 01090300 | 0104 |
| 01090700 | 0105 |
| 01090900 | 0106 |
| 01090b00 | 0107 |
| 01090d00 | 0108 |
| 01090f00 | 0109 |
| 010b0000 | 010a |
| 010d0000 | 010b |
| 010f0000 | 010c |

FIG. 20

| RECEPTION PORT | 0101 | 0102 | 0103 | 0104 | 0105 | 0106 | 0107 | 0108 | 0109 | 010a | 010b | 010c |
|---|---|---|---|---|---|---|---|---|---|---|---|---|
| 1 | 2 | (1) | 4 | 6 | 8 | 2 | 4 | 6 | — | (3) | (5) | (7) |
| 2 | 8 | (1) | 2 | 4 | 6 | 8 | 2 | 4 | — | (3) | (5) | (7) |
| 3 | 6 | (1) | 8 | 2 | 4 | 6 | 8 | 2 | — | (3) | (5) | (7) |
| 4 | 4 | (1) | 6 | 8 | 2 | 4 | 6 | 8 | — | (3) | (5) | (7) |
| 5 | 2 | (1) | 4 | 6 | 8 | 2 | 4 | 6 | — | (3) | (5) | (7) |
| 6 | 8 | (1) | 2 | 4 | 6 | 8 | 2 | 4 | — | (3) | (5) | (7) |
| 7 | 6 | (1) | 8 | 2 | 4 | 6 | 8 | 2 | — | (3) | (5) | (7) |
| 8 | 4 | (1) | 6 | 8 | 2 | 4 | 6 | 8 | — | (3) | (5) | (7) |
| 9 | 2 | (1) | 4 | 6 | 8 | 2 | 4 | 6 | — | (3) | (5) | (7) |
| 10 | 8 | (1) | 2 | 4 | 6 | 8 | 2 | 4 | — | (3) | (5) | (7) |
| 11 | 6 | (1) | 8 | 2 | 4 | 6 | 8 | 2 | — | (3) | (5) | (7) |
| 12 | 4 | (1) | 6 | 8 | 2 | 4 | 6 | 8 | — | (3) | (5) | (7) |
| 13 | 2 | (1) | 4 | 6 | 8 | 2 | 4 | 6 | — | (3) | (5) | (7) |
| 14 | 8 | (1) | 2 | 4 | 6 | 8 | 2 | 4 | — | (3) | (5) | (7) |
| 15 | 6 | (1) | 8 | 2 | 4 | 6 | 8 | 2 | — | (3) | (5) | (7) |
| 16 | 4 | (1) | 6 | 8 | 2 | 4 | 6 | 8 | — | (3) | (5) | (7) |

FABRIC SYSTEM AND METHOD FOR ASSIGNING IDENTIFIER FOR FABRIC APPARATUS THEREFOR

BACKGROUND OF THE INVENTION

1. Field of the Invention

The present invention relates generally to a fabric system constructed with a plurality of fibre channel fabric apparatus. More particularly, the invention relates to a system construction method upon multi-connecting of fabrics and an identifier assigning method dividing addresses between a plurality of ports upon multi-connection and determining delivery destination at high speed upon establishing multi-connection.

2. Description of the Related Art

Conventionally, in this type of technology, upon establishing connection between a plurality of fibre channel fabric devices, an identification information is individually set for each fibre channel fabric device according to its connection.

In the foregoing prior art, upon establishing connection of a plurality of fibre channel fabric devices, the identification information has to be set individually for each fibre channel fabric device. Therefore, setting of the identification information has been quite troublesome.

On the other hand, in the conventional fibre channel fabrics, realizing of fabrics connecting a plurality of terminal nodes with one device has been difficult for necessity of quite high performance and expensive fabrics.

Furthermore, since sufficient E_Ports used for connection between the fibre channel fabrics are not provided, a problem has been encountered in occurrence of blocking and routing performance being not enhanced.

Upon establishing connection between a plurality of fibre channel fabrics, it is possible to establish connection by exchanging service parameter, as disclosed in Japanese Unexamined Patent Publication No. Heisei 8-249263. However, it is not possible to achieve sufficient performance by difference of the parameter.

SUMMARY OF THE INVENTION

A first objection of the present invention is to propose a fabric system and an identification information assigning method therefor for automatically setting an identification information of each fibre channel fabric device upon establishing connection between a plurality of fibre channel fabric devices.

A second object of the present invention is to propose a fabric system and an identification information assigning method therefor for significantly reducing load on management, such as externally and individually set, configuration information by performing intervention between connected devices and autonomously collecting and establishing configuration information.

A third object of the present invention is to propose a fabric system an identification information assigning method therefor, by realizing improvement of performance as whole system by sharing particular operation of the terminal nodes during delivery of the frame between connected fibre channel fabric devices and by reducing load of respective devices.

According to the first aspect of the invention, a fabric system connecting a plurality of fabric groups into a plurality of stages between terminal nodes and performing exchange of variable length frame, the fabric comprises assignment signal transmitting means for transmitting an assignment signal fixedly assigned an identifier per port connected to other fabrics, identifier assigning means for receiving said assignment signal transmitted from other fabric and assigning identifier determining own identifier according to a predetermined rule on the basis of said assignment signal, configuration information transmitting means transmitting a configuration information indicative of correspondence of identifiers of the fabrics connected to the ports, retrieval information preparing means for preparing a retrieval information for determining a fabric of transfer destination of the received frame per port and a port number on the basis of the identifier of each fabric and the configuration information, and transfer destination determining means for determining the transfer destination of the frame on the basis of the retrieval information.

In the preferred construction, transmission of an identifier assignment signal by the assignment signal transmitting means and reception of the assignment signal from the identifier assignment means and assignment of the identifier are repeated until the identifiers are assigned for all fabrics.

In another preferred construction, one of the fabrics connected to a terminal node is taken as a master fabric, the master fabric has an identifier as an initial value, upon assignment of the identifier, initially, a fixed identifier is assigned per port.

In another preferred construction, the fabric system may comprise a first stage fabric group connected to one terminal node, a third stage fabric group connected to the other terminal node, and a second stage fabric group connecting the first stage and third stage fabric groups.

In another preferred construction, the fabric system may comprise a first stage fabric group connected to one terminal node, a third stage fabric group connected to the other terminal node, and a second stage fabric group connecting the first stage and third stage fabric groups, one of the first stage or third stage being taken as master fabric having an identifier as an initial value;

next, the assignment signal being transmitted from the second fabric group, and finally, sad assignment signal being transmitted from the fabric other than the maser fabric.

In another preferred construction, the transfer destination determining means of the fabric comprise storage means for storing own identifier, retrieval information storage means for storing the retrieval information, comparing means for comparing the identifier of the received frame and the identifier of the storage means per se, and selecting means for selecting a port number included in the received frame as a port number of the transfer destination when the identifiers are matched as a result of comparison by the comparing means and the retrieval information is retrieved by the port number included in the received frame to select the port number of the transfer destination when the identifiers are not matched.

In another preferred construction, one of fabrics connected to terminals nodes as a mastering fabric, the mastering fabric has an identifier as an initial value, transmits the assignment signal assigning a fixed identifier per port, at first, upon assigning the identifier; collects identifiers of all fabrics after completion of assignment of identifiers, prepares a conversion table converting the identifiers into second identifiers having smaller data length to distribute for all fabrics, the fabrics distributed for the conversion table prepare retrieval information for determining fabrics of transfer destination of the received frame per port and port number on the basis of the conversion table and the configuration information.

According to the second aspect of the invention, an identifier assignment method per each fabric in a fabric system connecting a plurality of fabric group into a plurality of stages between terminal nodes for exchanging variable length frame, comprising the steps of:

in the fabric, transmitting an assignment signal assigning a fixed identifier per port connected to other fabrics, receiving the assignment signal transmitted from other fabric and assigning identifier determining own identifier according to a predetermined rule on the basis of the assignment signal, transmitting configuration information corresponding to identifier of the fabric connected to the port, and preparing a retrieval information for determining the fabric of transfer destination of the received frame per port and the port number on the basis of the identifier of each fabric and the configuration information.

In the preferred construction, transmission of the identifier assignment signal, reception of the assignment signal and assignment of identifier are repeated until the identifiers are assigned for all fabrics.

In another preferred construction, taking one of fabrics connected to the terminal node as a mastering fabric having an identifier as an initial value, the mastering fabric transmits the assignment signal assigning fixed identifier per port at first, upon assigning the identifier.

In another preferred construction, a first stage fabric group connected to one terminal node, a third stage fabric group connected to the other terminal node, and a second stage fabric group connecting the first stage and third stage fabric groups, one of the first stage or third stage being taken as master fabric having an identifier as an initial value;

next, the assignment signal being transmitted from the second fabric group, and finally, sad assignment signal being transmitted from the fabric other than the maser fabric.

In another preferred construction, each fabric compares the identifier of the received frame and own identifier, and selects a port number included in the received frame as a port number of the transfer destination when the identifiers are matched as a result of comparison by the comparing means and the retrieval information is retrieved by the port number included in the received frame to select the port number of the transfer destination when the identifiers are not matched.

In another preferred construction, one of fabrics connected to terminals nodes as a mastering fabric having an identifier as an initial value, the mastering fabric transmits the assignment signal assigning a fixed identifier per port, at first, upon assigning the identifier; collects identifiers of all fabrics after completion of assignment of identifiers, prepares a conversion table converting the identifiers into second identifiers having smaller data length to distribute for all fabrics;

the fabrics distributed for the conversion table prepare retrieval information for determining fabrics of transfer destination of the received frame per port and port number on the basis of the conversion table and the configuration information.

According to another aspect of the invention, a computer readable memory storing a computer program performing assignment of identifier per each fabric in a fabric system connecting a plurality of fabric group into a plurality of stages between terminal nodes for exchanging variable length frame, the computer program comprising the steps of:

in the fabric, transmitting an assignment signal assigning a fixed identifier per port connected to other fabrics, receiving the assignment signal transmitted from other fabric and assigning identifier determining own identifier according to a predetermined rule on the basis of the assignment signal, transmitting configuration information corresponding to identifier of the fabric connected to the port, and preparing a retrieval information for determining the fabric of transfer destination of the received frame per port and the port number on the basis of the identifier of each fabric and the configuration information.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings:

FIG. 10 is an illustration showing a process for performing SID assignment in the case that a fabric 21 is MF, in the fabric system of FIG. 1;

FIG. 11 is an illustration showing SIS received by a fabric 22, in the fabric system of FIG. 1;

FIG. 12 is an illustration showing a connection information obtained by a fabric 23 in the fabric system of FIG. 1;

FIG. 13 is an illustration showing a SID-FID conversion table in the fabric system of FIG. 1;

FIG. 14 is a chart showing a retrieval table prepared by the fabric 25 in the fabric system of FIG. 1;

FIG. 16 is an illustration showing a process showing progress of SID assignment in the case where a fabric 103 is MF in the fabric system of FIG. 15;

FIG. 17 is an illustration showing received by a fabric 102 in the fabric system of FIG. 15;

FIG. 18 is an illustration showing a connection information obtained by a fabric 108 in the fabric system f FIG. 15;

FIG. 19 is an illustration showing a SID-FID conversion table in the fabric system of FIG. 15;

FIG. 20 is a chart showing a retrieval table generated by a fabric 109 in the fabric system of FIG. 15;

DESCRIPTION OF THE PREFERRED EMBODIMENT

Figure 1:
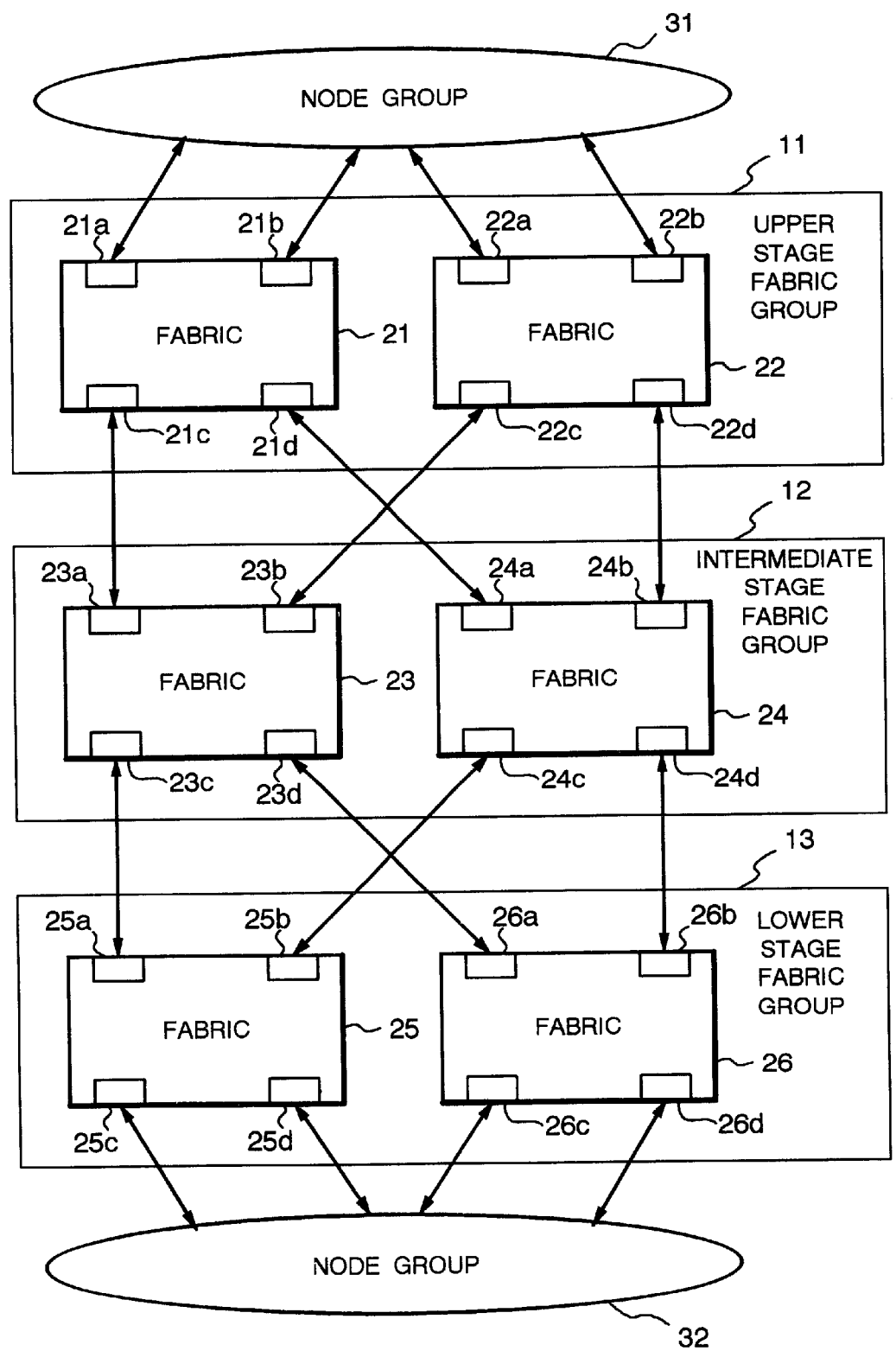
FIG. 1 is a chart showing a connection of the first embodiment of a fabric system according to the present invention, which fabric system is consisted of six 4-port fabrics.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

At first, a fabric system performing exchange of variable length frame according to the present invention will be briefly discussed. In the present invention, a connection of a fibre channel fabric device (hereinafter simply referred to as "fabric") forming the fabric system requires three-stage construction. When any of respective fabrics have counterparts connected to ports, the fabrics has means which can identify notes or fabrics.

Such three-stage construction is established by equally dividing the fabrics forming the fabric system into an upper stage, an intermediate state and a lower stage. Among the fabrics divided into three groups, the fabrics belonging the upper stage and the lower stage are permitted connection with the nodes. The fabrics in the intermediate stage is not permitted to be connected to the node and are only connected with the fabrics in the upper stage and the lower stage.

Direct connection between the fabrics in the upper stage and the lower stage is not permitted. On the other hand, connection between the fabrics in the same group is not permitted. The foregoing rules are summarized as follow:

a) connection between fabrics in the same group is inhibited;

b) fabrics in the upper stage and the lower stage are only connected to the intermediate stage or node;

c) connection of the fabrics in the intermediate stage to the node is inhibited; and d) all fabrics in the intermediate stage are connected to all fabrics in the upper stage and the lower stage.

Connection between the fabrics is established in such a manner that the fabric in the upper stage has to be equally connected to respective fabrics in the intermediate stage, similarly, the fabrics in the lower stage has to be equally connected to respective fabrics in the intermediate stage. While multiple connection can be established between the same fabrics, it has to be guaranteed that multiple connection between all fabrics are the same. The fabric system this constructed becomes a non-blocking construction.

Furthermore, by selecting one from fabrics in the upper stage or the lower stage connected as set forth above, a master fabric (hereinafter referred to as MF) has to be set. The fabric directly connected to the MF is referred to as secondary fabric (hereinafter referred to as SF). Among fabrics directly connected to the SF except for the MF will be referred to as third fabric (hereinafter referred to as TF).

Next, discussion will be given for procedure of obtaining connection.

At a timing completing all connection, the MF initiates obtaining of configuration information of the fabric system. At the same, for all fabric, unique switch identification numbers (hereinafter referred to as SID") are set. Assignment of SID is performed in the following procedure.

a) The MF transmits a unique SID assignment signal (hereinafter referred to as SIS) for each port with respect to all port, to which the fabrics are connected.

b) The fabric receiving the own SIS determines SID on the basis of a given rule from all of received SIS's.

c) On the basis of the own SID of the fabric, the unique SIS is transmitted per each port for all ports connected to the fabrics.

d) In the SIS, the SID of the transmission side is included.

e) The MF maintains SID provided as the initial value.

After repeating the foregoing procedure for a given period or a given number of times, transmission of the SIS is stopped to restrict variation of the SID. By restriction of variation of the SIS, connection information of all ports of the fabric is fixed. Then, each fabric transfers the own connection information to all of the adjacent fabrics.

The fabrics located in the upper stage and the lower stage and whereby permitted to be connected with the node, establish configuration information of the fabric system based on the connection information transferred from the adjacent fabrics.

Then, the MF creates a SID-FID conversion table showing correspondence to the SID and a fabric identifier (hereinafter referred to as FID) on the basis of the connection information transferred from the SF. The conversion table is delivered to all fabrics in the fabric system through the SF. By this, all fabrics can obtain FID of the adjacent fabrics from the SID-FID conversion table.

The FIDs form base of node identifier (hereinafter referred to as NID) to be assigned for the nodes connected to the fabrics. Here, the NID is consisted of the FID and a port identifier of the fabric (hereinafter referred to as LID). By obtaining the FID, all fabric completes generation of a routing information and completes autonomous obtaining and establishing of configuration information.

Next, division of the address will be explained.

The FID corresponds to Area_ID for 8 bits and Domain_ID for 8 bits for setting a common value in the fabric system among 24 bits of address to be assigned for each port to realize division of the address as the fabric system. A Port_ID of the remaining 8 bits among 24 bits of address corresponds to a port number of each fabric.

Next, procedure of the routing will be explained.

In the fabric system, the fabric of the upper stage and the lower stage extract an FID portion from the NID (=D_ID) indicative of transfer destination of the frame transmitted from the node and makes judgment whether the extracted FID matches with the own FID. When the extracted FID matches with the own FID, a port to be transmitted from the LID (=Port_ID) is specified and delivered. If not matched, the fabric of the intermediate stage is delivered for its own judgment. On the other hand, the fabric of the intermediate stage is connected to all fabrics of the upper stage and the lower stage, determines the port for delivery on the basis of the connection information and the FID in the NID (=D_ID) to transfer frame.

next, the first embodiment of the fabric system according to the present invention will be discussed in detail with reference to the accompanying drawings.

A construction of the first embodiment of the fabric system of the present invention is illustrated in FIG. 1. Referring to FIG. 1, the shown embodiment of the 8-port fabric system is constructed by connecting six 4-port fibre channel fabric (hereinafter simply referred to as fabric) 11 to 16. The fabric system is a three-stage construction consisted of an upper stage fabric group 11, an intermediate stage fabric group 12 and a lower stage fabric group 13. The upper stage fabric group 11 is consisted of fabrics 21 and 22. The intermediate stage fabric group 12 is consisted of fabrics 23 and 24. The lower stage fabric group 13 is consisted of fabrics 25 and 26.

The fabric 21 has ports 21a, 21b serving as F_port and ports 21c and 21d serving as E_port. The fabric 22 has ports 22a and 22b serving as F_port and ports 22c and 22d serving as E_port. The fabrics 23 and 24 have ports 23a to 23d and ports 24a to 24d respectively serving as E_port. The fabric 25 has ports 25a and 25b serving as E_pors and 25c and 25d serving as F_port. On the other hand, the fabric 26 has ports 26a and 26b serving as E_port and ports 26c and 26d serving as F_port.

Here, the E_port of the fabric is a word in a fibre channel standard representative of port to be used for connection between the fabrics. Also, the F_port of the fabric is a word in the fibre channel standard representative of port to be used for connection with the node.

Furthermore, the upper stage fabric group 11 is connected to node group 31 as aggregate of nodes. The lower stage fabric group 13 is connected to node group 32 as aggregate of nodes.

Here, detailed discussion will be given with respect to a construction of a fibre channel fabric forming the foregoing fabric system.

Figure 2:
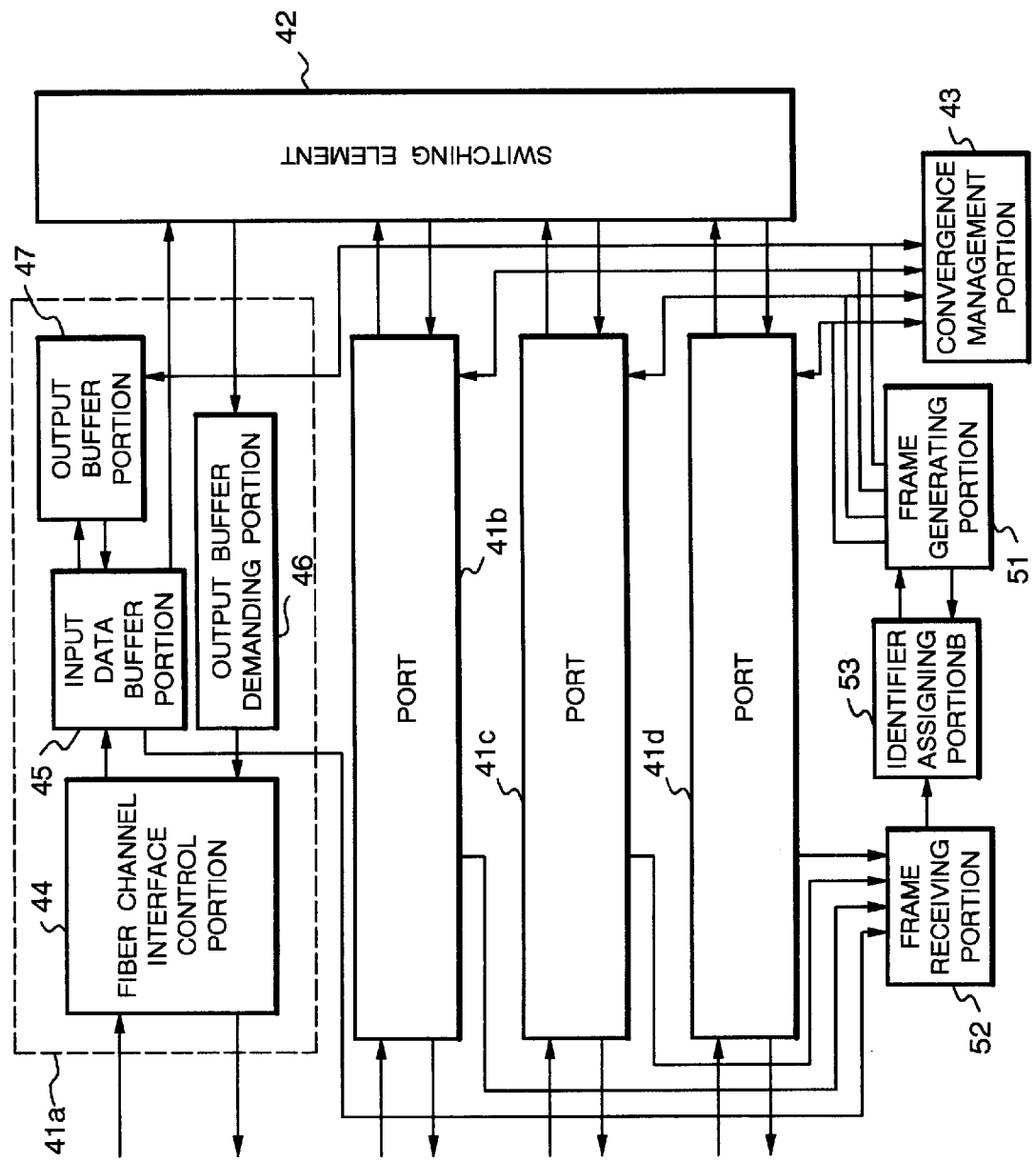
FIG. 2 is a block diagram showing a construction of the 4-port fabric according to the present invention.

As shown in FIG. 2, respective fabrics 21 to 26 have ports 41a to 41d. Each port is constituted of a fibre channel inter face control portion 44 connected to a terminal node or other fabric and performing a protocol control of the fibre channel, an input data buffer portion 44 temporarily storing a frame received from the terminal node or other fabric, an output buffer demand portion 47 determining an output destination of the input frame and an output data buffer portion 46 for temporarily storing frame to be output.

On the other hand, each fabric 21 to 26 is constructed with a switching element 42 transferred the frame data from the input data buffer portion 45 to the output data buffer portion 46, a convergence management portion 43 monitoring load on the switch element and controlling convergence, a frame generating portion 51 for outputting an arbitrary frame, a frame receiving portion 52 holding the arbitrary frame within the fabric without transferring for making reference to, and an identifier assigning portion 53 for performing assignment of identifier for the fabric device in the fabric system utilizing the foregoing means or components.

The fibre channel interface control portion 44 is means performing a protocol control by a communication system based on the fibre channel standard. The fibre channel interface control portion 44 outputs the data input from the fibre channel interface to the input data buffer portion 45 and outputs data input from the output data buffer portion 46 to the fibre channel interface.

The input data buffer portion 45 is means for temporarily storing the input data from the fibre channel interface.

Figure 3:
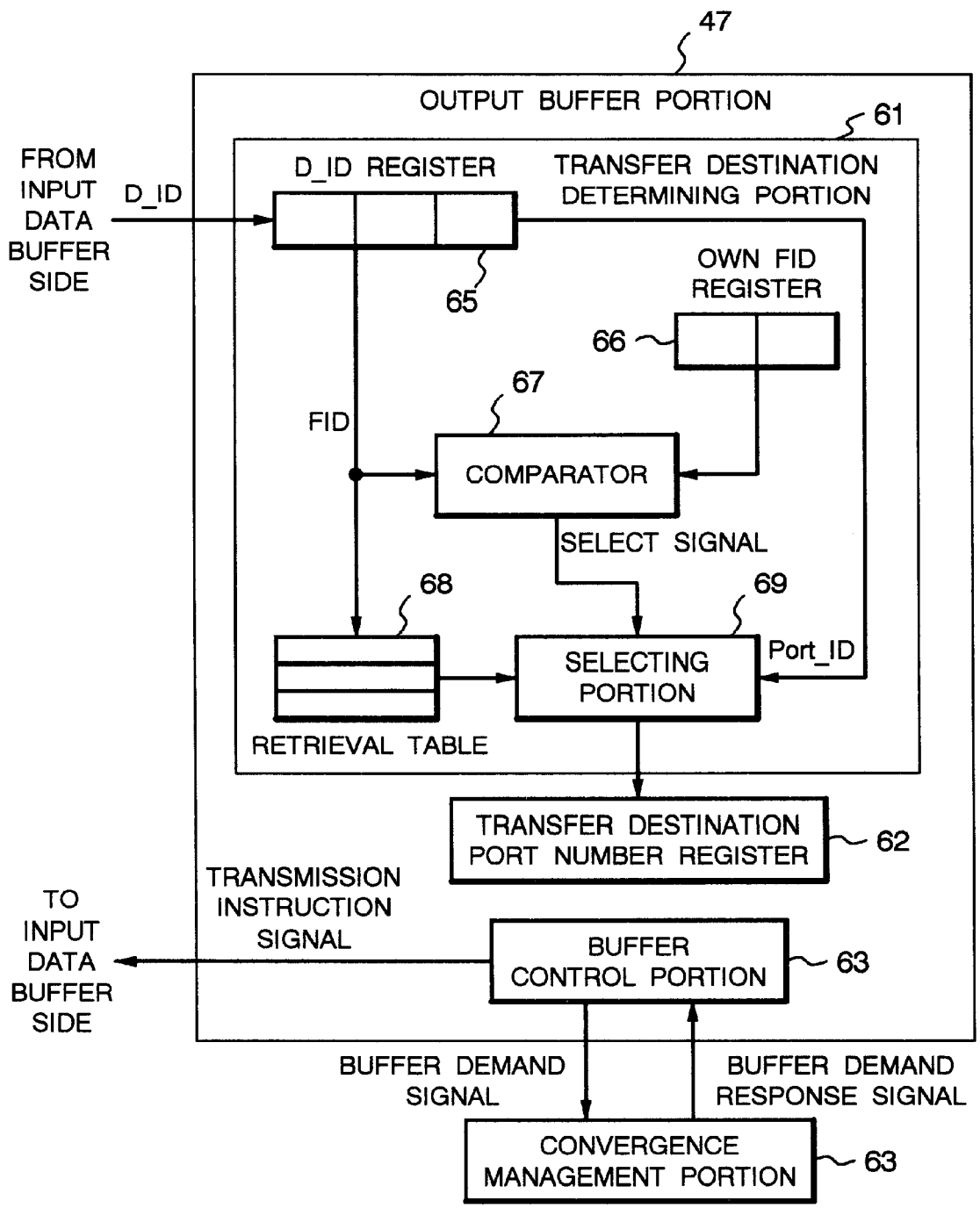
FIG. 3 is a block diagram showing a construction of an output buffer demanding portion in FIG. 1.

The detailed construction of the output buffer demanding portion 47 is illustrated in FIG. 3. The output buffer demanding portion 47 is constructed with a transfer destination determining portion 61, a transfer destination port number register 62 and a buffer control portion 63.

Figures 8, 9:
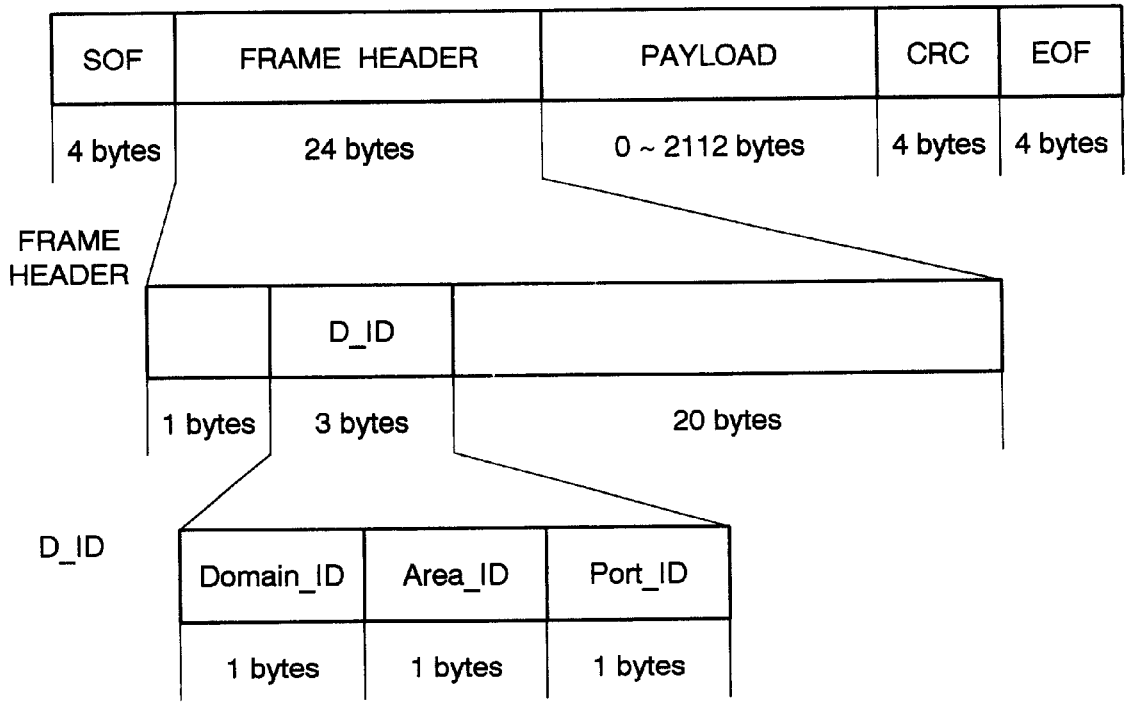
FIG. 8 is a chart showing an example of format of the fibre channel frame.
FIG. 9 is an illustration showing an example of format of SIS.

A 3-byte D_ID filed among a frame header of the fibre channel frame shown in FIG. 8, input from the input data buffer portion 45, send inquiry for determining transfer destination to the transfer destination determining portion 61, demands and obtain the output buffer of the transfer destination port determined per frame data and commands for the input data buffer portion 45 for transferring to the switch element 42. Here, D_D field is the field designating the address upon frame transfer in the fibre channel standard.

The transfer destination determining portion 61 has an own FID register 66 holding an identifier FID of an own fabric device. The transfer destination determining portion 61 further includes a D_D register 65 temporarily storing 3 byte D_D filed in the frame header input from the output buffer demanding portion 47, a retrieval table 68 for determining the transfer destination, a comparing portion 67 comparing the FID extracted from the D_ID filed and the FID of the own FID register 66, and a selecting portion 69 selecting a port number in the fabric device to be the transfer destination of the frame data with reference to the retrieval table 68 with taking the value of D_D register as key.

The selector portion 69 outputs the port number within the fabric device to be the transfer destination of the frame data to the transfer destination port number register 62, demands and obtains the output buffer of the transfer destination port determined per frame data to and from the convergence management portion 43, and commands transfer to the switch element to the input data buffer portion 45.

Figure 4:
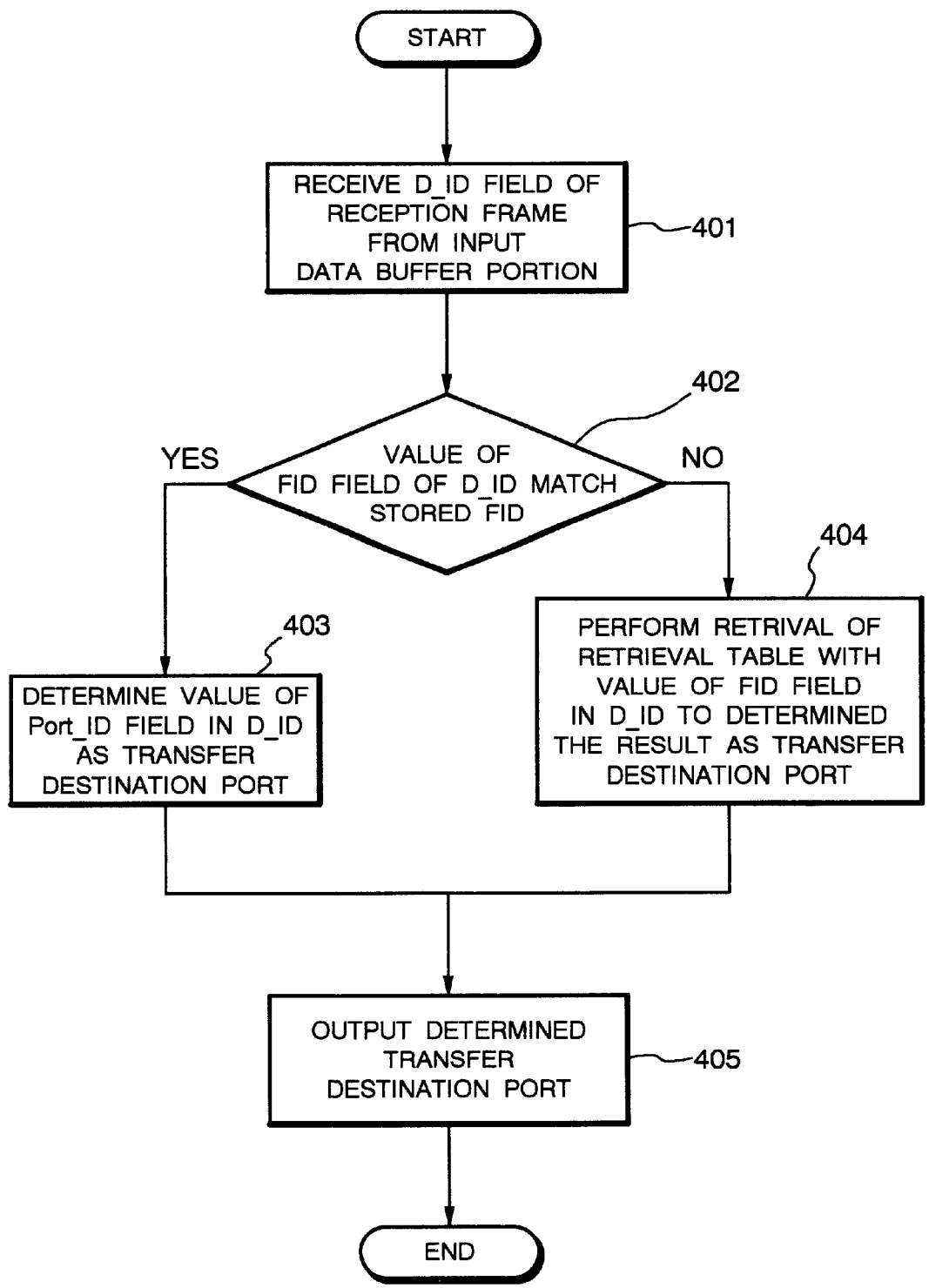
FIG. 4 is a flowchart showing a process for determining a transfer destination port.
Figure 5:
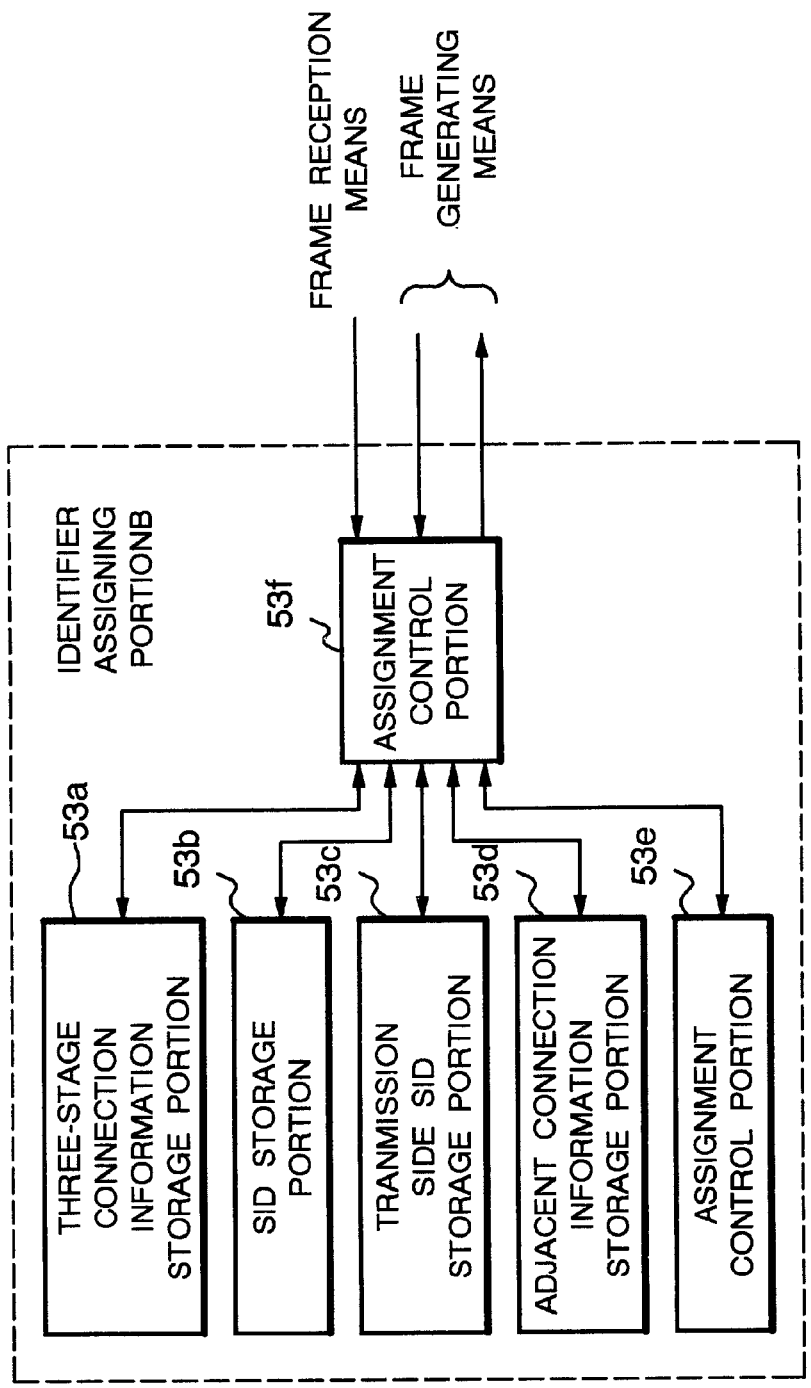
FIG. 5 is a block diagram showing a construction of an identifier assigning portion according to the present invention.

A determining method of the port number in the fabric as the transfer destination by the transfer determining portion 61 is executed on the basis of the following procedure. This procedure will be discussed with reference to the flowchart of FIG. 4.

At first, the D_D field of the received fibre channel frame data is received from the input data buffer portion 45 to store in the D_D register 65 (step 401).

Next, the FID portion is extracted from the D_D field and is compared with the FID of the own FID register 66 (step 402).

When the FID portion extracted from the D_D field and is matched with the FID of the own FID register 66, the Port_ID field of the D_ID field is determined as the transfer destination of the input frame data (step 403).

When the FID portion extracted from the D_ID field and is not matched with the FID of the own FID register 66, the port number obtained through retrieval of the retrieval table 68 is determined as the transfer destination of the input frame data with taking the FID extracted from the D_D field as key (step 404). Then, the frame data is output to the determined transfer destination portion (step 405).

The output data buffer portion 46 is designed for temporarily store the frame data transferred from the input data buffer portion 45 through the switch element 42 and inputting the stored data to the fibre channel interface control portion 44.

The convergence management portion 43 makes judgment whether the output data buffer portion 46 can be used or not on the basis of the port number in the fabric of the transfer destination as the output of the transfer destination determining portion 61 to output response to the buffer demand from the output demanding portion 47.

The frame generating portion 51 is designed so that the fabric device generates the arbitrary frame for transmitting and the generated frame is transmitted to the connected terminal node or other fabric device via the fibre channel interface control portion 44.

The frame receiving portion 52 is means for taking and reading the frame transmitted from the terminal node or other fabric device connected via the fibre channel interface control portion 44.

The identifier assigning portion 53 includes a three-stage connection information storage portion 53a storing three-stage connection information of the fabric device, the SID storage portion 53b holding the SID, the SID storage portion 63c for storing SID of the transmission side of the SIS required per E_Port of the fabric device, a conversion table storing portion 63d for storing the conversion table from SID and FID, and an adjacent connection information storage portion 53e for storing connection information of the adjacent fabric device. Also, the identifier assigning portion 53 includes an assignment control portion 53f performing process control of the identifier assignment.

An identifier assignment method can be realized for simplification of the process by specifying connection of the fabric device in the fabric system to three-stage construction. In the three-stage construction, the fabrics forming the foregoing fabric system are equally divided into three groups, in which one group is taken as the intermediate fabric group 12 all port thereof being E_Ports, and remaining two groups are taken as upper stage and lower stage fabric groups 11 and 13 equally dividing all ports into E_Ports and F_Ports. Connection between respective fabric devices is performed between E_Ports and is established according to the following rules.

a) Connection between the fabrics in the same fabric group is not established.
b) All of the fabrics in the upper stage fabric group are connected to the fabrics in the intermediate stage fabric group.
c) All of the fabrics in the lower stage fabric group are connected to the fabrics in the intermediate stage fabric group.
d) All of the fabrics in the intermediate stage fabric group are connected to the upper stage fabric group, and to the lower stage fabric group.
e) Among the fabric device in the upper stage fabric group and the lower stage fabric group, only one master fabric device (MF) is set.

The process in the identifier assignment portion 53 is divided into two stages. As the former stage, obtaining configuration information is performed. As the later stage, assignment of identifier is performed.

The former process for obtaining the configuration information is performed in the following procedure.

a) The MF has an initial value of the switch identification number (hereinafter referred to as SID).
b) The fabric device transmits the unique SID assignment signal (SIS) as a particular frame data per all E_Port via the frame generating portion 51, n the basis of the SID when the SID of the own fabric device is held.
c) The fabric receiving the SIS via the frame receiving portion 52 determines the own SID on the basis of the given rule from received all of SIS and holds. At the same time, the SID indicative of the transmission side fabric of SIS per received E_Port.
d) The foregoing process of a) to c) are repeated for a given period or a given number of times.

Figure 6:
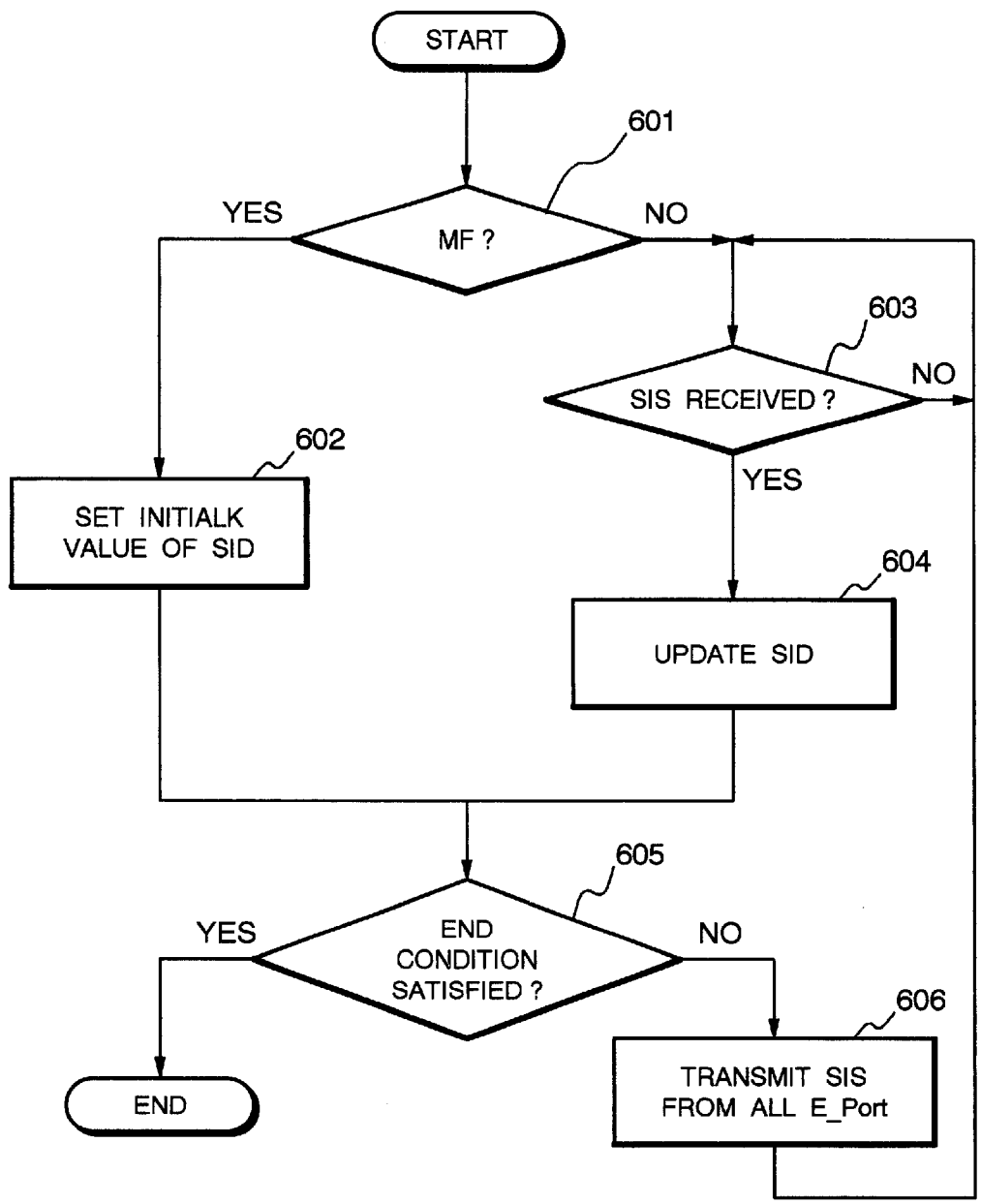
FIG. 6 is a flowchart showing a procedure of a SID assignment upon establishing of the fabric system.

A process of obtaining the configuration information will be discussed hereinafter with reference to the flowchart of FIG. 6. When the own fabric is MF (step 601), the MF sets SID as the initial value (step 602).

Subsequently, since end condition is not satisfied (step 605), the MF transmits the SIS from all of the E_Ports (step 606).

The fabric receiving the SIS (step 603) determines own SID according to the given rule based on all of received SIS and holds the same. At the same time, per received E_Port, SID representative of the transmission side fabric of SIS is received (step 604). The foregoing process is repeated for the given period or the given number of times set as the end condition.

Figure 7:
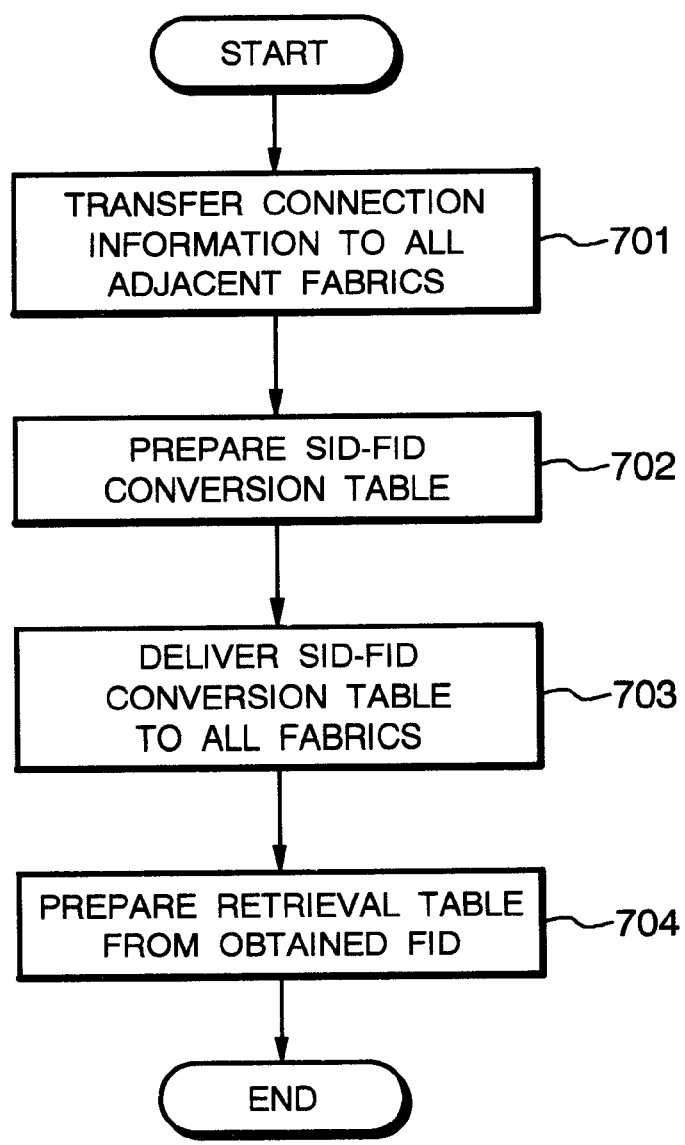
FIG. 7 is a flowchart showing a procedure after identifier assignment subsequent to SID assignment upon establishing of the fabric system.

Subsequently, process of assignment of the identifier will be discussed with reference to the flowchart of FIG. 7.

After completion of assignment of the SID, each fabric device transmits connection information indicative of correspondence of the SID of the destination fabric devices of connection of all E_Port with respect to all fabric device (step 701). Because of the three stage construction, the MF collects all SID in the fabric system from a construction table of the SF, and creates the conversion table for converting SID into FID which corresponds to SID in one-by-one basis (step 702). Then, the conversion table is distributed to all fabric devices forming the fabric system through the SF (step 703).

All fabric devices determines fabric for transferring the frame to the terminal node not matching with the own FID from the SID-FID conversion table and connection table, to create the retrieval table (routing information) required in the transfer destination determining portion 61, and to complete establishment of the fabric system by setting for the retrieval table 68 (step 704).

When the terminal node is connected to the fabric device in the fibre channel system, the terminal node receives "Address Identifier" as the identifier for identifying the terminal node per se by fabric log-in. The identifier of the terminal node uses the value of D_D field designating the transfer destination of the fibre channel frame. Assignment of the terminal node identifier is authorized to the fabric. The setting method of the terminal node identifier is determined correspondence with the retrieval table of the transporting destination determination means by setting combination of the FID determined by the identifier assignment portion 53 of the fabric device and the port number of the fabric.

In the present invention, when the received fibre channel frame is not the transfer destination, the transfer destination is determined by the retrieval table 68. Therefore, file the connection structure is fixed to three stage, in communication between the terminal nodes, the path to pass the frame can be modified freely. On the other hand, since the retrieval table 68 can be set per port, it becomes possible to distribute load in order to avoid concentration of the load to the particular path by modifying and adjusting setting.

Furthermore, in the present invention, it should be obvious to expand the 4-port construction shown in FIG. 1 by modifying the convergence control portion and the switch element.

In the shown embodiment, as shown in FIG. 9, a format of the SIS is set as a value of 4 byte for dividing the field per one byte. When the SIS is handled as the value of 4 byte to match with SID as is.

The initial value of the SID which only MF has is a hexadecimal number "01000000h". Namely, the value "1" is set only for the MF field, and the value "0" is set forth other field. When value, in which the port number beginning from 1 is set in the SF field when the MF outputs SIS, in the TF field when the SF outputs the SIS, to the FF field when the RF outputs the SIS.

Here, SF represents the fabric adjacent MF, TF represents the fabric adjacent the fabric. However, the TF does not include the MF.

Upon outputting the SIS, which of the MF, SF and TF the own fabric corresponds can be judged by the lowermost digit of the non-zero value of each field of the SID. On the other hand, in the shown embodiment, the updating condition of the SID is set as the minimum value of all of received SIS when the SID is handled as 4 byte value. On the other hand, repeating condition of the SID assignment procedure (end condition) is to perform SIS transmission up to three times. Furthermore, the value corresponding to the Domain_ID in 2 byte FID is fixed to "1", and Area_ID is assigned in sequential order from "1".

In the fabric system of FIG. 1, when the fabric 21 is set as the MF, the SID assignment procedure is progressed as shown in FIG. 10.

Here, the fabric 22 (TF) is determined the SID on the basis of the SIS transmitted by the fabrics 23 and 24 (SF). The value of the received SIS is as shown in FIG. 11. Among this, since the minimum value is the value of SIS transmitted by the fabric 23, the SID of the fabric is determined as "1101030200".

As set forth above, as a result of repetition of the SIS transmission, the connection information is completed in each fabric. The connection information is correspondence table of the SID of the fabric connected to each E_Port. On the other hand, the SID of the connected fabric is nothing but one, in which the lowermost digit of the non-zero field of the finally received SIS per port is modified to "0". The content of the connection information of the fabric 23 of FIG. 1 is as shown in FIG. 12.

The fabric 21 (MF) receives connection information of the fabrics 23 and 24 (SF)to obtain SID of all fabrics forming the fabric system.

The fabric 21 (MF) lines up obtained all SIDs in ascending order to generate the SID-FID conversion table by assigning FID (2 byte) in sequential order. Namely, in this case, the SID-FID conversion table is as shown in FIG. 13.

In the upper stage and lower stage fabrics 21, 22, 25 and 26, the internal port number of the output destination to be set wit respect to the retrieval table 58 cannot be set in straightforward manner. However, by uniformly distributing the internal port number as the output destination, the load of the overall fabric system can be made uniform. The retrieval table 58 of the fabric 25 is shown in FIG. 14. In FIG. 14, the reception port 1 to 4 correspond to ports 25a to 25d of the fabric 25 and shows the port receiving the fibre channel frame. For example, it shows that when the frame data addressed to the fabric 21 (MF) of FID "0101" is received at the port "3" (25c), the frame data is transferred to the port "1" (25a). It should be noted that the figure in the parenthesis in FIG. 14 represents that the corresponding port number is preferentially and fixedly assigned.

Next, the second embodiment of the present invention will be discussed in detail with reference to FIGS. 15 to 20.

Figure 15:
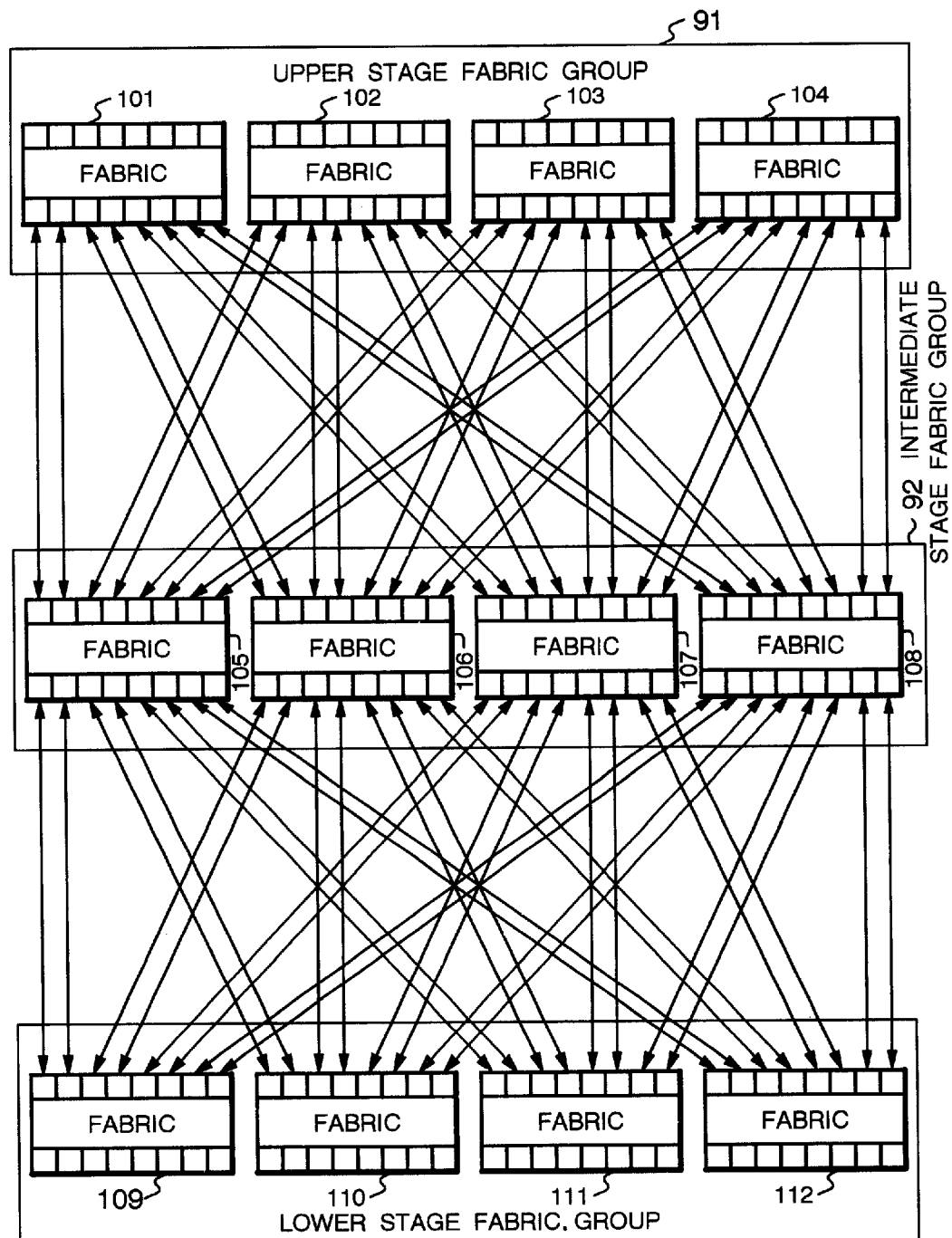
FIG. 15 is an illustration showing a connection of the second embodiment of the fabric system consisted of twelve 8-port fabric according to the present invention.

As shown in FIG. 15, the fabric system of the shown embodiment is constructed by connecting twelve 16 port fabrics according to connecting fabric system to be connected to sixty-four nodes. This fabric system is consisted of the upper stage fabric group 91, the intermediate stage fabric group 92 and the lower stage fabric group 93.

In the shown fabric system, different from the first embodiment set forth above, a plurality of paths are present in connection between the same fabrics. Other matters, such as format of the SIS, the initial value of the SID owned by the MF, the updating condition of the SID and repetition procedure of the SID assignment are the same as the first embodiment.

The procedure of the SID assignment in the case where the fabric 103 is set as the MF is progressed as shown in FIG. 16.

Here, the fabric 102 determined the SID based on the SIS transmitted by the fabrics 105 to 108 (SF). The value of the received SIS is as shown in FIG. 17. Amongst, the minimum value is the value of SIS transmitted by the fabric 105. Therefore, the SID of the fabric 105 is determined to be "01090300h".

As set forth above, as result of repetition of SIS transmission, connection information is completed in each fabric. The connection information is the correspondence table of the SID of the fabric connected to the E_Port of the fabric. On the other hand, the SID of the connected fabric is nothing but one, in which the lowermost digit of the non-zero field of the finally received SIS per port is modified to "0". The content of the connection information of the fabric 108 is as shown in FIG. 18.

The fabric 103 (MF) receives the connection information of the fabric 105 to 108 (SF) and obtains the SID of the all fabrics forming the fabric system. Furthermore, the fabric 103 (MF) lines up the obtained all SID in ascending order to assign the FID in sequential order to create the SID-FID conversion table. In this case, the SID-FID conversion table is shown in FIG. 19.

In the upper stage and lower stage fabrics 101 to 104 and 109 to 112, from the connection information received from all of the intermediate stage fabrics 105 to 108, the internal port of the output destination set for the retrieval table 58 cannot be determined in straightforward manner. However, by uniformly distributing the internal port number as the output destination, the load of the overall fabric system can be made uniform.

By preferentially assigning the output destination port for the FID of the adjacent fabric, the retrieval table 58 is created by the system distributing so that the output destination port number can be uniformly used over the entire system. On the other hand, in this discussion of the operation, the retrieval table 58 is provided for each port. The result of creation of the retrieval table n the fabric 109 is shown in FIG. 20. It should be noted that the figure in the parenthesis in FIG. 20 represents that the corresponding port number is assigned preferentially and fixedly.

By the present invention set forth above, upon forming the fabric system, the configuration information is not necessary to be set for each fabric. The reason is that the configuration information in the present invention can be autonomously obtained.

On the other hand, it becomes unnecessary to provide particular large scale fabrics. By applying for relatively small scale fabric, large scale fabric system can be established. The reason should be clear from the object of the present invention.

Furthermore, upon constructing the fabric system, in the communication between the terminal nodes, performance difference is hardly caused. The reason is, in communication with the terminal node not connected to the same fabric, number of fabrics is the same in any path, extreme performance difference cannot be caused.

Next, the third embodiment of the fabric system according to the present invention will be discussed.

Figure 21:
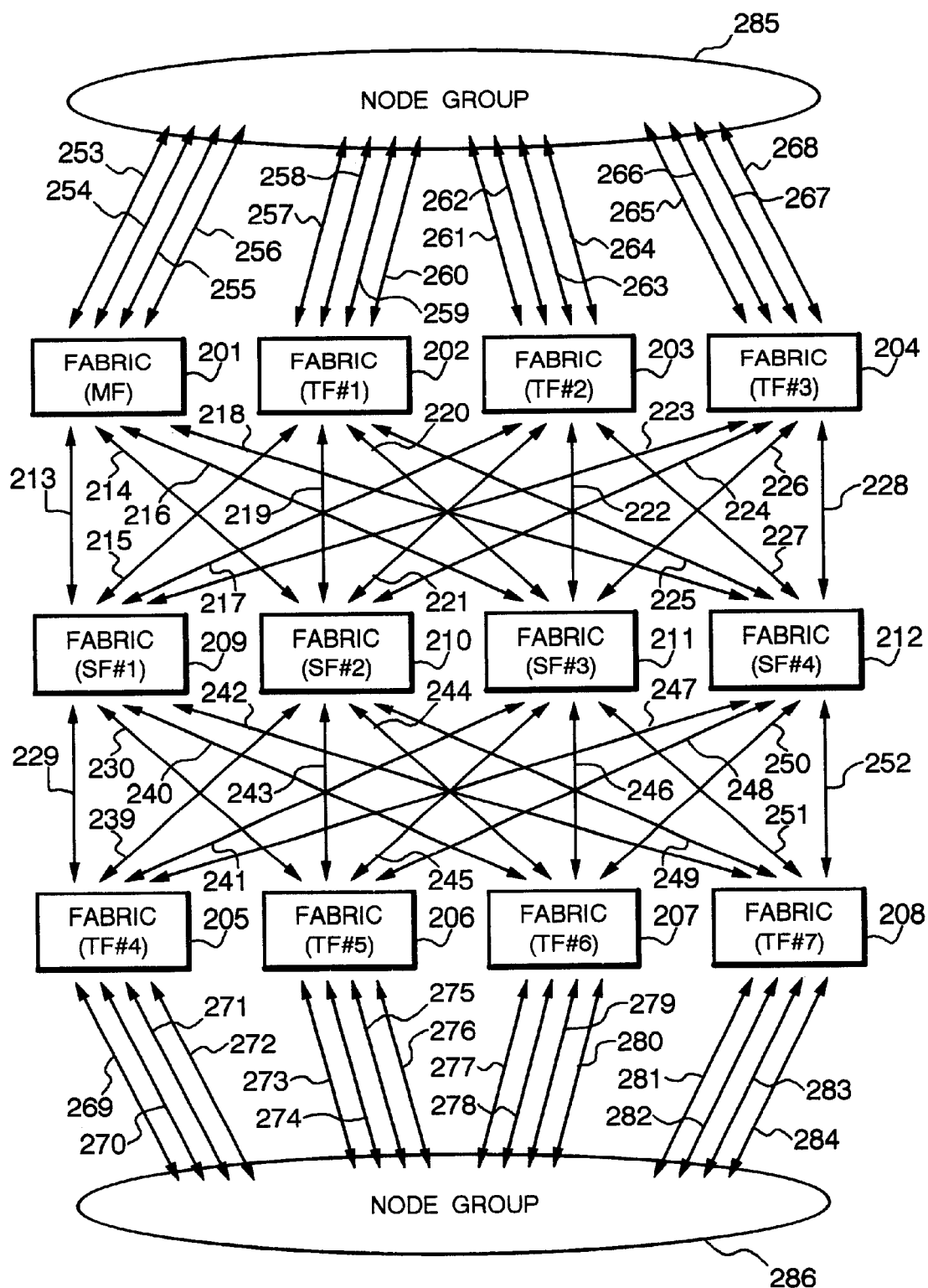
FIG. 21 is a block diagram showing the third embodiment of a fabric system according to the present invention.

FIG. 21 is a block diagram showing the fabric system in a condition constructed employing twelve fabrics respectively having 32 ports. The fibre channel fabric devices 201 to 212, connection paths 213 to 252 between the fabrics, node groups 285 to 286 as aggregates of the nodes connected to the fabric system, and connection paths 253 to 284 connecting the fabrics and respective nodes. On the other hand, among fibre channel fabrics 201 to 212, 201 is selected as MF. The fabrics 209 to 212 adjacent the MF become SF. The fabrics 202 to 208 other than MF adjacent the SF become TF. In FIG. 21, the connection paths 213 to 252 between the fabrics is illustrated as one path between the same fabrics but four paths are present in practice.

Figure 22:
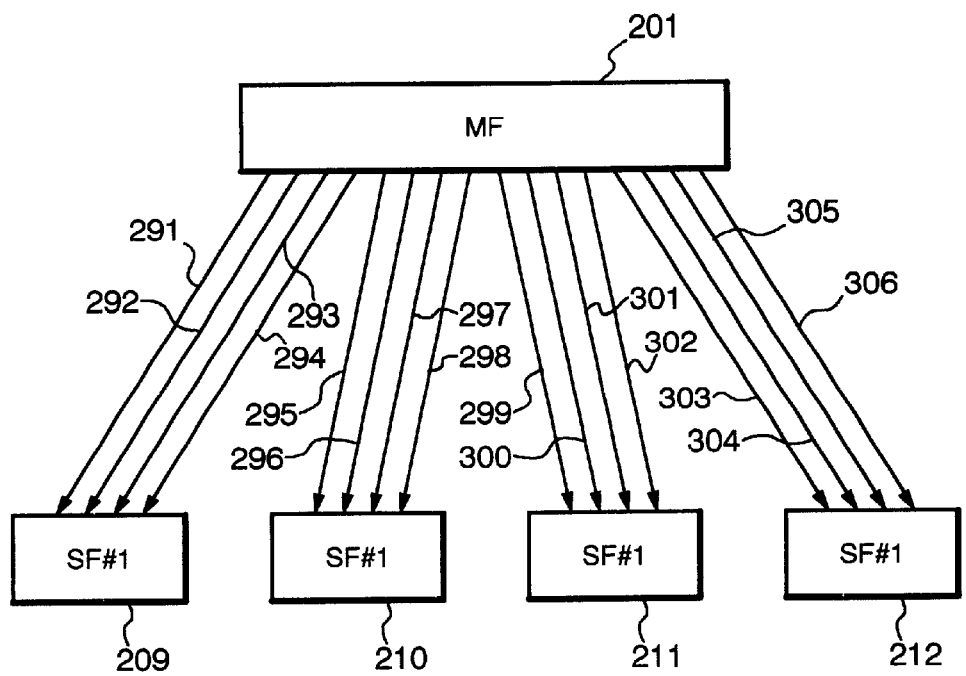
FIG. 22 is an illustration showing a construction of a master fabric and a secondary fabric during establishment of the third embodiment of the fabric system according to the invention.

FIG. 22 is a block diagram showing a manner where the SIS is triggered for autonomously obtain the configuration information in the fabric system, which is constructed with the fibre channel fabric (MF) 201, the fibre channel fabrics (SF) 209 to 212 and connection paths 291 to 306 between the fabric.

Figure 23:
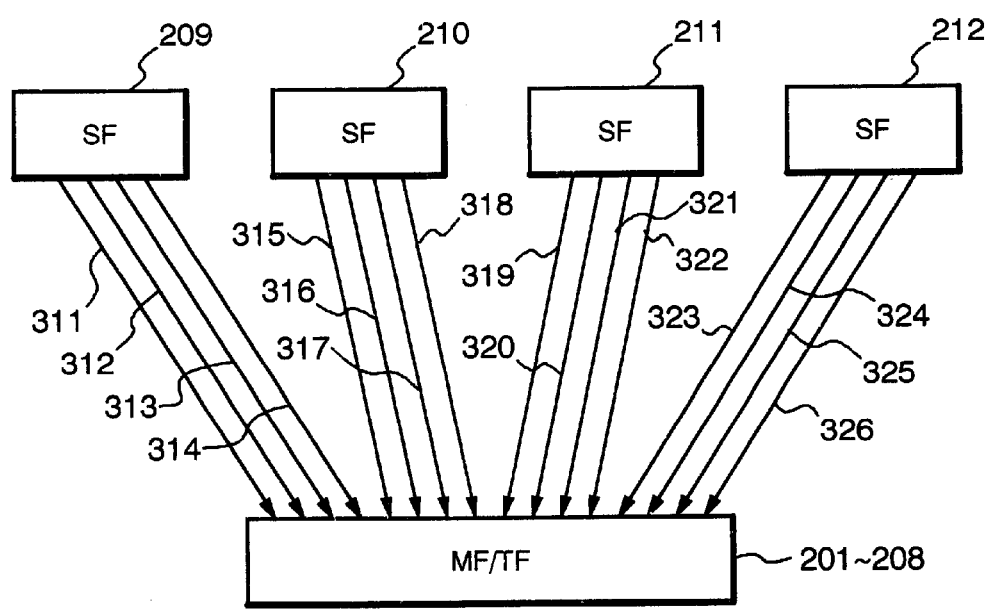
FIG. 23 is an illustration showing a construction of a fabric adjacent the secondary fabric during establishment of the third embodiment of the fabric system.

FIG. 23 is a block diagram showing a manner in the case where the SIS for autonomously obtaining the configuration information in the fabric system from a plurality of SFs, which includes the fibre channel fabrics (SF) 209 to 212, the fibre channel fabrics (other than SF) 201–208 and connection paths 311 to 326.

Next, the operation in the shown embodiment of the present invention will be discussed in detail.

In the constructional illustration of the fabric system shown in FIG. 21, division of the fabrics into three groups is performed so that the fabrics located in lateral alignment may belong the same group. The fabric 201 (MF), the fabrics 209 to 212 (SF) and fabrics 202 to 204 and 205 to 209 (TF) are divided in a manner set forth above. A timing at which the SF and the TF can be detected as SF or TF, is after initiation of SIS transmission by the MF.

As shown in FIG. 22, the fabric 201 (MF) issues SIS through all ports in order to perform SID assignment for the fabrics 209 to 212 (SF). As shown in FIG. 23, the fabrics 209 to 212 (SF) issues SIS from all ports in order to perform SID assignment for the fabrics 202 to 204 and 205 to 208 (TF). However, issuance of the SIS is performed until the fabric 209 to 212 (SF) receive the SID assignment.

Either in FIGS. 22 and 23, issuance of the SIS is performed in a direction shown by the connection passages 291 to 306 and 311 to 326 between the fabrics. On the other hand, as shown in FIGS. 22 and 23, even when a plurality of connection paths are present between the same fabrics, the system may operate without causing any problem. In any case, each fabric recognizes the SID having highest preferential order among all SID assigned, as own SID. In the shown embodiment, the content of setting of the preferential order will be discussed hereinafter.

a) When assignments are given from different sources, preference of the SID is given for those assigned by MF, SF and TF in sequential order.

b) When the levels of the sources of assignment are the same (assignments are given from a plurality of SF or a plurality of TF), preference is given for the SID assigned to the fabric at which the assignment source of the SID is minimum.

c) When assignments are given from the same assignment source, the minimum SID among those assigned is given highest preference to make own SID.

After repeating issuance of SIS and SID determination for 10 seconds, all fabrics stop issuance of the SIS, restrict variation of the SIS, and determine the SID at that time as own SID, and then variation is inhibited.

After fixing of the SIDS, each fabric delivers the connection information indicative of connection of the ports and the fabrics, to all of the adjacent fabrics. Furthermore, the fabric 201 (MF) obtains the SID of all fabrics in the fabric system from the connection information derived to the fabrics 209 to 212 (SF). Based of the obtained SID, the conversion table from original SID into FID is generated. Upon conversion into the FID, the MF and the TF are preferentially assigned and the SF is given lower preference to perform conversion with low preferential order.

The fabric 201 (MF) delivers the SID-FID conversion table thus prepared to all of the fabrics 209 to 212 (SF). Then, all of the fabrics 209 to 212 delivers the conversion table to adjacent fabrics.

By this, to all fabrics in the fabric system, the fabric receiving the SID-FID conversion table generates the retrieval table (routing information) to make kind uniform.

As can be clear from the discussion set forth above, by the present invention, when a plurality of fabrics are connected, a large scale fabric system with small performance loss can be easily established.

It should be noted that the identifier assignment method to the fabric device in the shown embodiment of the fabric system can be realized by hardware construction of the frame generating portion 51, the frame receiving portion 52m the identifier assignment portion 53 and other functions However, it is also possible to realized by loading the programs having respective functions in the memory of the computer processing system. The computer program may be stored in a magnetic disk, a semiconductor memory and other storage medium. Then the programs are loaded to the computer processing system to control the operation of the computer processing system to realize the foregoing functions, respectively.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A fabric system comprising a plurality of interconnected fabric groups, said fabric groups divided into a plurality of stages between terminal nodes, said fabric system being used for exchanging variable length frames, each fabric in said fabric groups further including:

assignment signal transmitting means for transmitting an assignment signal uniquely assigning a switch identifier per port connected to fabrics in the fabric group other than said each fabric;

identifier assigning means for receiving said assignment signal transmitted from fabrics in the fabric groups other than said each fabric and assigning a switch identifier for said each fabric and determining a fabric identifier, said assigning being performed according to a rule and on the basis of said assignment signal;

configuration information transmitting means for transmitting a configuration information indicative of correspondence of switch identifiers of fabrics other than said each fabric connected to ports in said each fabric;

retrieval information preparing means for preparing a retrieval information for determining a fabric corresponding to a transfer destination for a received frame per port and a port number, said retrieval information being prepared on the basis of a switch identifier corresponding to each fabric and said configuration information; and transfer destination determining means for determining the transfer destination of said frame on the basis of said retrieval information.

2. A fabric system as set forth in claim 1, wherein transmission of an identifier assignment signal by said assignment signal transmitting means and reception of said assignment signal from said identifier assignment means and assignment of the identifier are repeated until said identifiers are assigned for all fabrics.

3. A fabric system as set forth in claim 1, wherein one of said fabrics connected to a terminal node is taken as a master fabric, said master fabric has an identifier as an initial value, upon assignment of said identifier, initially, a fixed identifier is assigned per port.

4. A fabric system as set forth in claim 1, which comprises a first stage fabric group connected to one terminal node;

a third stage fabric group connected to the other terminal node; and a second stage fabric group connecting said first stage and third stage fabric groups.

5. A fabric system as set forth in claim 1, which comprises a first stage fabric group connected to one terminal node;

a third stage fabric group connected to the other terminal node; and a second stage fabric group connecting said first stage and third stage fabric groups, one of said first stage or third stage being taken as master fabric having an identifier as an initial value;

next, said assignment signal being transmitted from said second fabric group, and finally, said assignment signal being transmitted from the fabric other than the maser fabric.

6. A fabric system as set forth in claim 1, said transfer destination determining means of said fabric comprises:

storage means for storing own identifier; retrieval information storage means for storing said retrieval information;

comparing means for comparing the identifier of the received frame and the identifier of said storage means and selecting means for selecting a port number included in said received frame as a port number of the transfer destination when the identifiers are matched as a result of comparison by said comparing means and said retrieval information is retrieved by the port number included in said received frame to select the port number of the transfer destination when the identifiers are not matched.

7. A fabric system as set forth in claim 1, wherein one of fabrics connected to terminals nodes as a mastering fabric, said mastering fabric has an identifier as an initial value, transmits said assignment signal assigning a fixed identifier-per port, at first, upon assigning said identifier;

collects identifiers of all fabrics after completion of assignment of identifiers, prepares a conversion table converting said identifiers into second identifiers having smaller data length to distribute for all fabrics;

said fabrics distributed for said conversion table prepare retrieval information for determining fabrics of transfer destination of the received frame per port and port number on the basis of said conversion table and said configuration information.

8. An identifier assignment method for a fabric in a fabric system, said fabric system comprising a plurality of interconnected fabric groups, said fabric groups divided into a plurality of stages between terminal nodes, said fabric system being used for exchanging variable length frames, said method comprising:

in said fabric, transmitting an assignment signal assigning a fixed identifier per port connected to fabrics in the fabric system other than said fabric;

receiving said assignment signal transmitted from fabrics in the fabric groups other than said each fabric and assigning a switch identifier for said each fabric and determining a fabric identifier, said assigning being performed according to a rule and-on the basis of said assignment signal;

transmitting a configuration information indicative of correspondence of switch identifiers of fabrics other than said each fabric connected to ports in said each fabric; and preparing a retrieval information for determining a fabric corresponding to a transfer destination for a received frame per port and a port number, said retrieval information being prepared on the basis of a switch identifier corresponding to each fabric and said configuration information.

9. An identifier assignment method in the fabric system as set forth in claim 8, wherein transmission of the identifier assignment signal, reception of said assignment signal and assignment of identifier are repeated until the identifiers are assigned for all fabrics.

10. An identifier assignment method in the fabric. system as set forth in claim 8, wherein taking one of fabrics connected to the terminal node as a mastering fabric having an identifier as an initial value, said mastering fabric transmits said assignment signal assigning fixed identifier per port at first, upon assigning said identifier.

11. An identifier assignment method in the fabric system as set forth in claim 8, wherein a first stage fabric group connected to one terminal node;

a third stage fabric group connected to the other terminal node; and a second stage fabric group connecting said first stage and third stage fabric groups, one of said first stage or third stage being taken as master fabric having an identifier as an initial value;

next, said assignment signal being transmitted from said second fabric group, and finally; said assignment signal being transmitted from the fabric other than the master fabric.

12. An identifier assignment method in the fabric system as set forth in claim 8, wherein each fabric compares the identifier of the received frame and own identifier, and selects a port number included in said received frame as a port number of the transfer destination when the identifiers are matched as a result of comparison by said comparing means and said retrieval information is retrieved by the port number included in said received frame to select the port number of the transfer destination when the identifiers are not matched.

13. An identifier assignment method of fabric system as set forth in claim 8, wherein one of fabrics connected to terminals nodes as a mastering fabric having an identifier as an initial value, said mastering fabric transmits said assignment signal assigning a fixed identifier per port, at first, upon assigning said identifier;

collects identifiers of all fabrics after completion of assignment of identifiers, prepares a conversion table converting said identifiers into second identifiers having smaller data length to distribute for all fabrics;

said fabrics distributed for said conversion-table prepare retrieval information for determining fabrics of transfer destination of the received frame per port and port number on the basis of said conversion table and said configuration information.

14. A computer readable memory storing a computer program performing a identifier assignment for a fabric in a fabric system, said fabric system comprising a plurality of interconnected fabric groups, said fabric groups divided into a plurality of stages between terminal nodes, said fabric system being used for exchanging variable length frames, said method comprising:

in said fabric, transmitting an assignment signal assigning a fixed identifier per port connected to fabrics in the fabric system other than said fabric;

receiving said assignment signal transmitted from fabrics in the fabric groups other than said each fabric and assigning a switch identifier for said each fabric and determining a fabric identifier, said assigning being performed according to a rule and on the basis of said assignment signal;

transmitting a configuration information indicative of correspondence of switch identifiers of fabrics other than said each fabric connected to ports in said each fabric; and preparing a retrieval information for determining a fabric corresponding to a transfer destination for a received frame per port and a port number, said retrieval information being prepared on the basis of a switch identifier corresponding to each fabric and said configuration information.

15. A computer readable memory having a identifier assignment program in the fabric system as set forth in claim 14, wherein said program repeats transmission of the identifier assignment signal, reception of said assignment signal and assignment of identifier are repeated until the identifiers are assigned for all fabrics.

16. A computer readable memory having a identifier assignment program in the fabric system as set forth in claim 14, wherein taking one of fabrics connected to the terminal node as a mastering fabric having an identifier as an initial value, said mastering fabric transmits said assignment signal assigning fixed identifier per port at first, upon assigning said identifier.

17. A computer readable memory having a identifier assignment program in the fabric system as set forth in claim 14, wherein a first stage fabric group connected to one terminal node;

a third stage fabric group connected to the other terminal node; and a second stage fabric group connecting said first stage and third stage fabric groups, one of said first stage or third stage being taken as master fabric having an identifier as an initial value;

next, said assignment signal being transmitted from said second fabric group, and finally, sad assignment signal being transmitted from the fabric other than the master fabric.

18. A computer readable memory having a identifier assignment program in the fabric system as set forth in claim 14, wherein each fabric compares the identifier of the received frame and own identifier, and selects a port number included in said received frame as a port number of the transfer destination when the identifiers are matched as a result of comparison by said comparing means and said retrieval information is retrieved by the port number included in said received frame to select the port number of the transfer destination when the identifiers are not matched.

19. A computer readable memory, having a identifier assignment program in the fabric system as set forth in claim 14, wherein one of fabrics connected to terminals nodes as a mastering fabric having an identifier as an initial value, said mastering fabric transmits said assignment signal assigning a fixed identifier per port, at first, upon assigning said identifier;

collects identifiers of all fabrics after completion of assignment of identifiers, prepares a conversion table converting said identifiers into second identifiers having smaller data length to distribute for all fabrics;

said fabrics distributed for said conversion table prepare retrieval information for determining fabrics of transfer destination of the received frame per port and port number on the basis of said conversion table and said configuration information.

* * * * *